(12) United States Patent
Zeng et al.

(10) Patent No.: US 11,903,525 B2
(45) Date of Patent: Feb. 20, 2024

(54) LIFTING DEVICE FOR STIRRING CUP OF BLENDER

(71) Applicant: AUONE ELECTRICAL COMPANY LIMITED, Guangdong (CN)

(72) Inventors: Qun Zeng, Guangdong (CN); Chiman Ao, Guangdong (CN)

(73) Assignee: AUONE ELECTRICAL COMPANY LIMITED (CN)

( * ) Notice: Subject to any disclaimer, the term of this patent is extended or adjusted under 35 U.S.C. 154(b) by 223 days.

(21) Appl. No.: 17/441,799

(22) PCT Filed: Jul. 4, 2019

(86) PCT No.: PCT/CN2019/094722
§ 371 (c)(1),
(2) Date: Sep. 22, 2021

(87) PCT Pub. No.: WO2021/000326
PCT Pub. Date: Jan. 7, 2021

(65) Prior Publication Data
US 2022/0167797 A1     Jun. 2, 2022

(30) Foreign Application Priority Data

Jul. 3, 2019   (CN) .......................... 201921028885.0
Jul. 4, 2019   (WO) ................. PCT/CN2019/094722

(51) Int. Cl.
*A47J 43/07*     (2006.01)
*A47J 43/046*    (2006.01)

(52) U.S. Cl.
CPC ......... *A47J 43/0722* (2013.01); *A47J 43/046* (2013.01)

(58) Field of Classification Search
CPC ....... A47J 43/0722; A47J 43/046; B66F 3/08; B66F 3/10
See application file for complete search history.

(56) References Cited

U.S. PATENT DOCUMENTS 3,873,066 A  *  3/1975  Opyrchal .................. B66F 3/08
                                                192/223.3
5,363,746 A  *  11/1994  Gordon .................... A23G 9/12
                                                366/601

(Continued)

FOREIGN PATENT DOCUMENTS

CN     201821418055.4          4/2019
EP       0255853 A2  *        2/1988
(Continued)

*Primary Examiner* — Marc C Howell
*Assistant Examiner* — Patrick M McCarty

(57) ABSTRACT

The present invention comprising a miniature direct current reduction motor, a transmission screw rod, a motor support base, a push column, a support plate and a push column cap; the miniature direct current reduction motor is fixedly connected to the motor support base, the motor support base is fixedly connected to the support plate, and an output shaft of the miniature direct current reduction motor is fixedly connected to the transmission screw rod, the transmission screw rod is in threaded connection with the push column, and the push column cap is fixedly connected to the push column; the push column can only move up and down within the support plate under the constraint of the guide structure; when the push column moves upwards, the push column cap is pressed against the bottom of the separated rotor inserted into the stirring cup of the stator to raise the stirring cup.

4 Claims, 5 Drawing Sheets

(56) References Cited

U.S. PATENT DOCUMENTS

| | | | |
|---|---|---|---|
| 6,254,019 B1 * | 7/2001 | Galbreath | A47J 43/085 |
| | | | 241/199.12 |
| 2010/0214867 A1 * | 8/2010 | Karkos, Jr. | A47J 43/085 |
| | | | 366/273 |
| 2014/0203010 A1 * | 7/2014 | Alet Vidal | A47J 27/004 |
| | | | 99/348 |
| 2016/0369898 A1 * | 12/2016 | Waehrisch | F16K 1/12 |

FOREIGN PATENT DOCUMENTS

| | | | | |
|---|---|---|---|---|
| GB | 153988 A | * | 11/1920 | |
| JP | S60194915 A | * | 10/1985 | |
| KR | 20100107655 A | * | 10/2010 | |
| WO | WO-2014183251 A1 | * | 11/2014 | A47J 43/0716 |

* cited by examiner

LIFTING DEVICE FOR STIRRING CUP OF BLENDER

TECHNICAL FIELD

This invention generally relates to the technical field of blenders, and more particularly, to a lifting device for a stirring cup for blenders.

BACKGROUND

Chinese patent 201821418055.4 discloses an axially-separated motor for a blender. Based on the aforesaid patent, the noise generated during the operation of a blender is significantly reduced. However, to allow a user to easily remove the stirring cup, one must overcome the gravity of the stirring cup and the attraction effect of the rotor magnet on the stator core during the axial separation of the rotor and the stator. This is a technical problem that need to be solved urgently.

SUMMARY

The purpose of the present invention is to provide a lifting device for a stirring cup of a blender. According to the present invention, the noise generated during the operation of the blender is significantly reduced and the stirring cup can be easily taken by a user.

To achieve the above objective, the present invention adopts the following technical solution: a lifting device for a stirring cup of a blender comprising a lifting device provided below a stator inside a base of the blender, wherein the lifting device comprises a miniature direct current reduction motor, a transmission screw rod, a motor support base, a push column, a support plate and a push column cap, wherein the miniature direct current reduction motor is fixedly connected to the motor support base, the motor support base is fixedly connected to the support plate, and an output shaft of the miniature direct current reduction motor is fixedly connected to the transmission screw rod, wherein the transmission screw rod is in threaded connection with the push column, wherein when the miniature direct current reduction motor propels the transmission screw rod to rotate, the push column can only move up and down within the support plate under the constraint of a guide structure, wherein the push column cap is fixed connected to the top of the push column, and the push column cap is arranged to correspond to the bottom of a separated rotor inserted into the stirring cup of the stator, wherein when the push column moves upwards, the push column cap is pressed against the bottom of the separated rotor inserted into the stirring cup of the stator to raise the stirring cup.

In another aspect of the present invention, the central position of the push column is provided with a threaded hole which is spirally connected with the transmission screw rod.

In another aspect of the present invention, the guide structure comprises a guide hole provided with a guide key in the support plate and a push column provided with a key groove on the outer side wall. The push column and the guide hole are in clearance fit.

In another aspect of the present invention, the motor support base is provided with a through hole for allowing the output shaft of the miniature direct current reduction motor to pass through.

In another aspect of the present invention, the miniature direct current reduction motor is fixedly connected to the motor support base by screws, the motor support base is fixedly connected to the support plate by screws, and the push column cap is fixed to the top surface of the push column by screws.

In another aspect of the present invention, the interior of the base is provided with an electric control assembly, and the miniature direct current reduction motor is electrically connected to the electric control assembly.

Compared with the prior art, the present invention has the following advantages: through adopting this design, the stirring cup can be easily removed by a user; the gravity of the stirring cup and the attraction effect of the separated rotor on the stator are effectively overcome; the device has simple structure, ingenious design, and high practicality.

In the Figures:
1—Stirring Cup, 10—Separated Rotor, 2—Blender Base, 20—Base Upper Cover, 21—Stator, 22—Support Sleeve, 23—Lifting Device, 231—Miniature Direct Current Reduction Motor, 232—Transmission Screw Rod, 233—Motor Support Base, 2331—Through Hole, 234—Push Column, 2341—Key Groove, 2342—Threaded Hole, 235—Support Plate, 2351—Guide Key, 2352—Guide Hole, 236—Push Column Cap, 24—Electric Control Assembly, 25—Base Lower Cover.

DETAILED DESCRIPTION

Drawings and embodiments are combined hereinafter to further elaborate the technical solution of the present invention.

Figure 1:
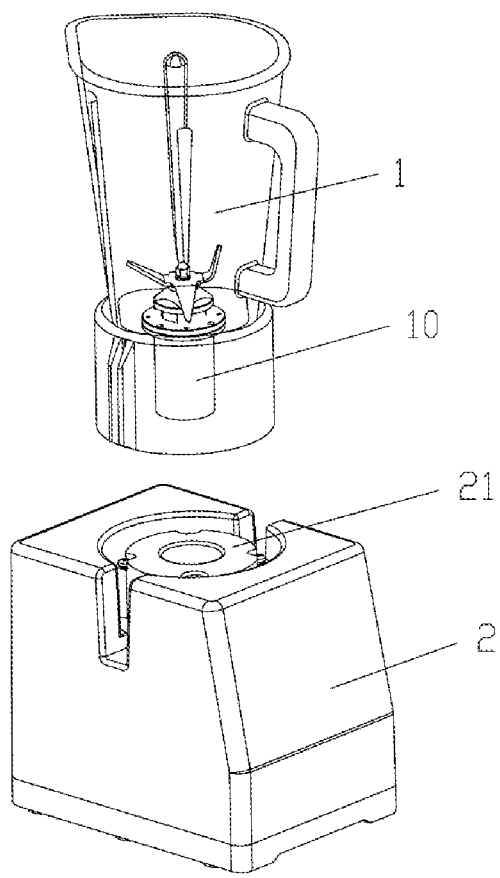
FIG. 1 is a conceptual diagram illustrating an exemplary structure of the blender of the present invention.
Figure 2:
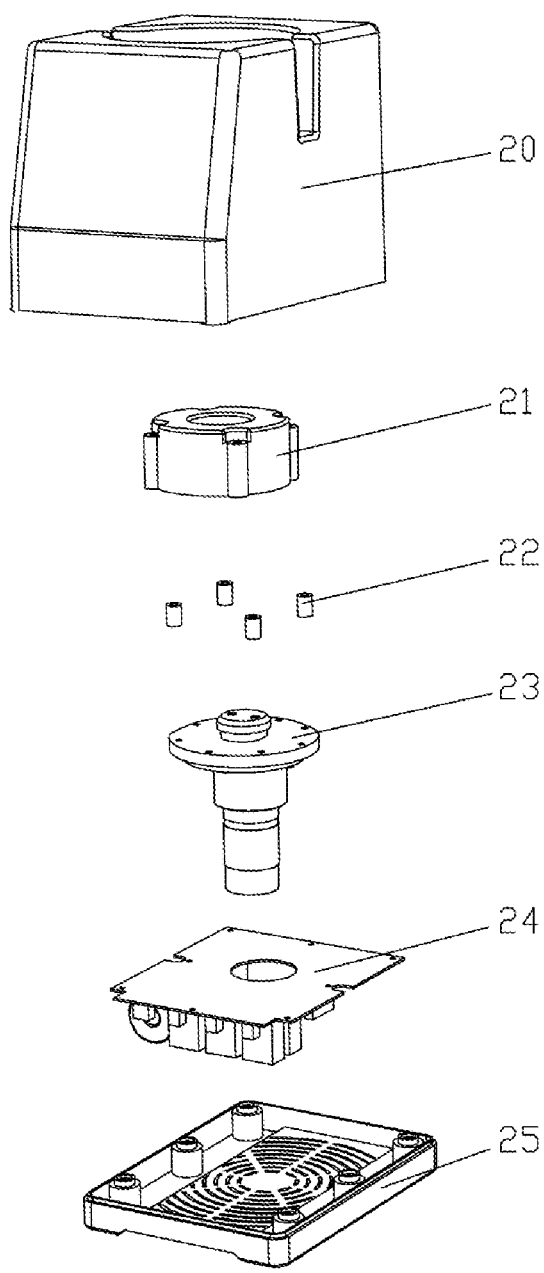
FIG. 2 is a conceptual diagram illustrating an exploded view of the base of the blender of the present invention.
Figure 3:
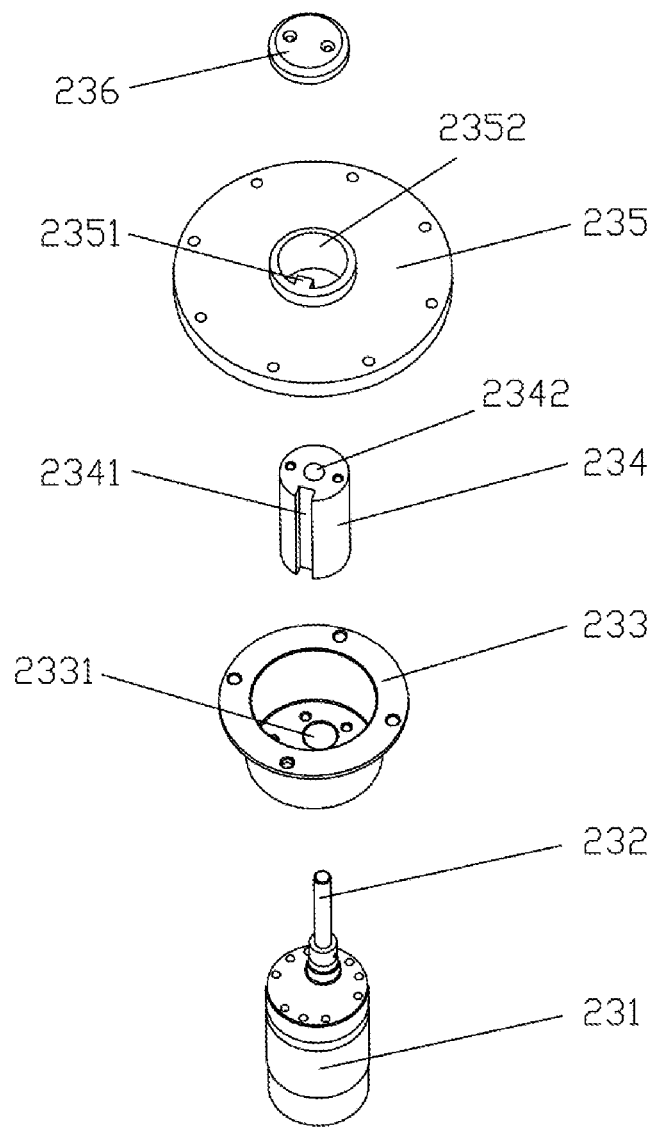
FIG. 3 is a conceptual diagram illustrating an exploded view of the lifting device of the present invention.
Figure 4:
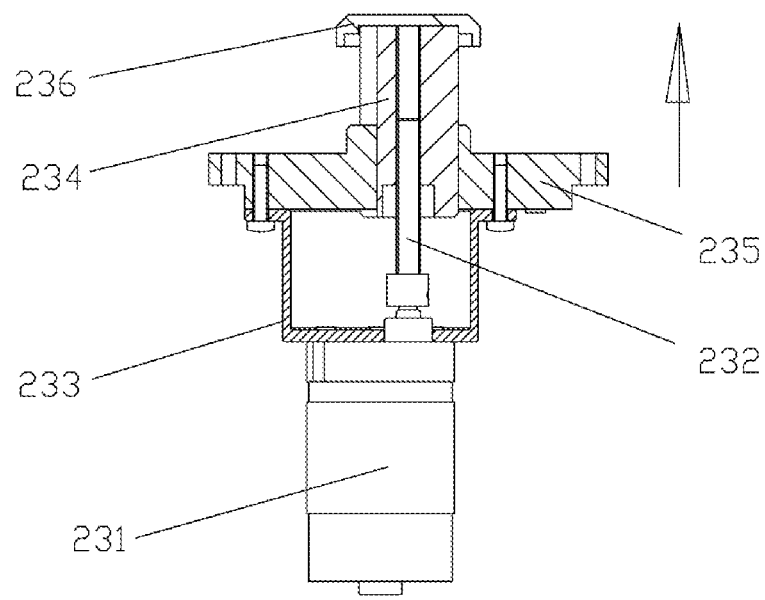
FIG. 4 is a conceptual diagram illustrating a state when the transmission screw rod propels the push column to move up.
Figure 5:
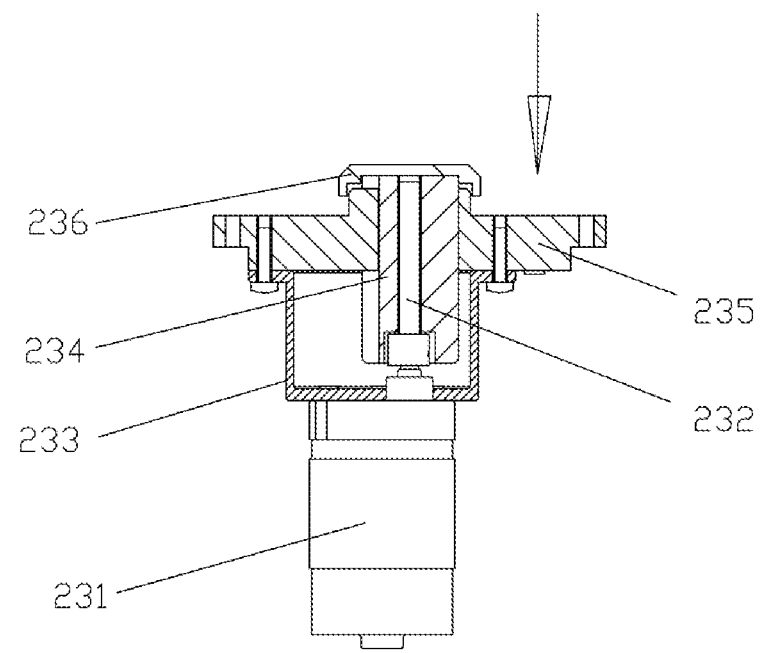
FIG. 5 is a conceptual diagram illustrating a state when the transmission screw rod propels the push column to move down.
Figure 6:
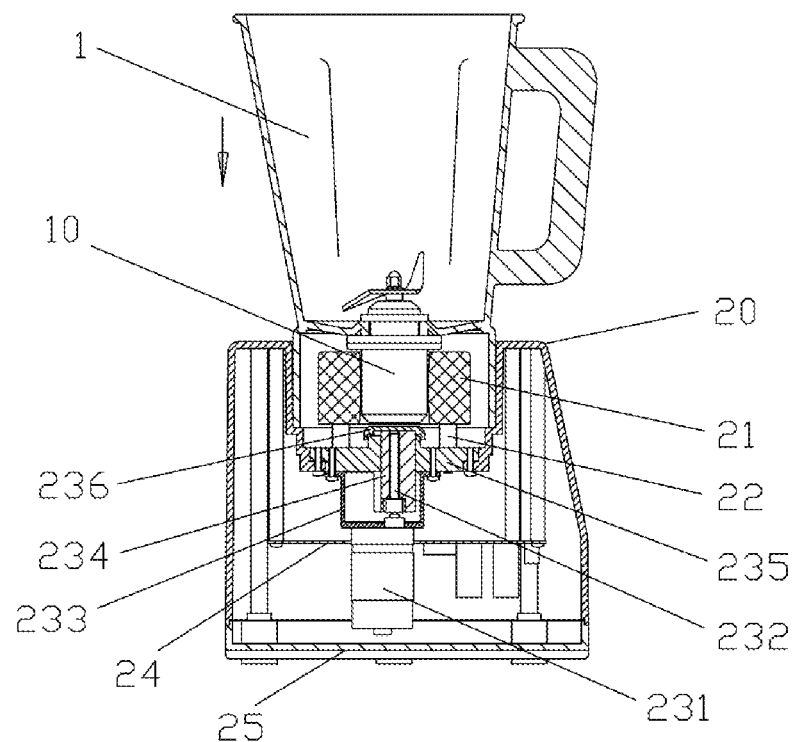
FIG. 6 is a conceptual diagram illustrating a state when the stirring cup is placed in the working position on the base of the blender before the lifting device is in contact with the separated rotor.
Figure 7:
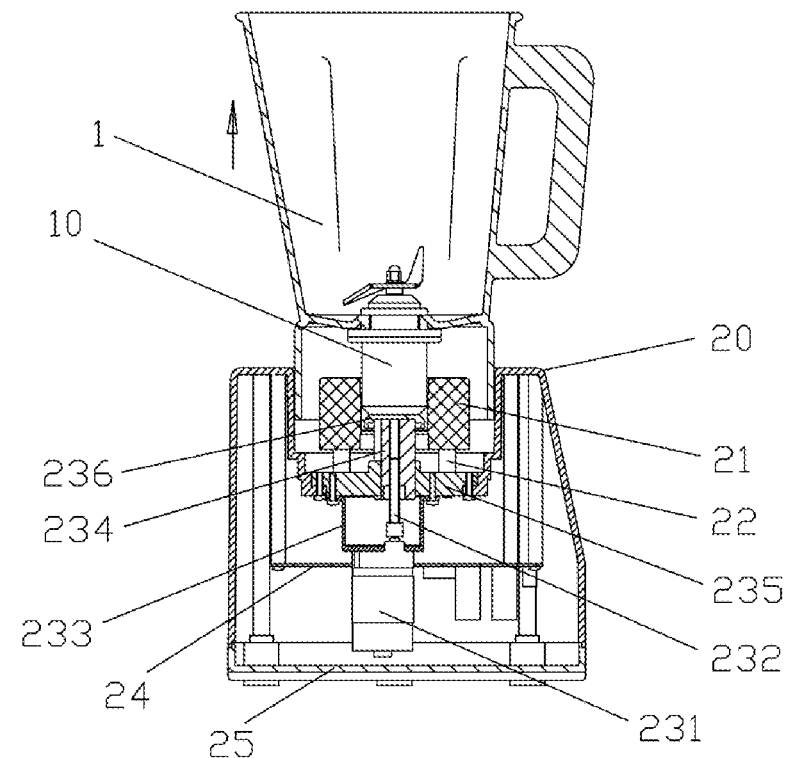
FIG. 7 is a conceptual diagram illustrating a state when the lifting device is pressed against the separated rotor to raise the stirring cup.

As shown in FIGS. 1-7, a lifting device for a stirring cup of a blender of the present invention comprises a lifting device 23 provided below a stator 21 inside a base 2 of the blender. The lifting device 23 comprises a miniature direct current reduction motor 231, a transmission screw rod 232, a motor support base 233, a push column 234, a support plate 235 and a push column cap 236. The miniature direct current reduction motor 231 is fixedly connected to the motor support base 233, the motor support base 233 is fixedly connected to the support plate 235, and an output shaft of the miniature direct current reduction motor 231 is fixedly connected to the transmission screw rod 232. The transmission screw rod 232 is in threaded connection with the push column 234. When the miniature direct current reduction motor 231 propels the transmission screw rod 232 to rotate, the push column 234 can only move up and down within the support plate 235 under the constraint of a guide structure. The push column cap 236 is fixed connected to the top of the push column 234, and the push column cap 236 is arranged to correspond to the bottom of a separated rotor 10 inserted into the stirring cup 1 of the stator 21. When the push column 234 moves upwards, the push column cap 236 is pressed against the bottom of the separated rotor 10 inserted into the stirring cup 1 of the stator 21 to raise the stirring cup 1. The aforesaid forms the basic structure of the present invention.

The operating principle of the present invention is as follow: the torque of the miniature direct current reduction motor 231 is converted into an axial force through the screw transmission, and the output shaft of the miniature direct current reduction motor 231 is fixedly connected to the transmission screw rod 232. During operation, the miniature direct current reduction motor 231 rotates to propel the transmission screw rod 232 to rotate together. Because the transmission screw rod 232 is in threaded connection with the push column 234, the push column 234 cannot rotate, but it moves up and down within a guide hole 2352 of the support plate 235 under the constraint of the guide structure. When the transmission screw rod rotates forwardly, the push column 234 moves up along the threaded direction, and when the transmission screw rod rotates reversely, the push column 234 moves down along the threaded direction. Because the push column cap 236 is fixed connected to the top of the push column 234, and the push column cap 236 is arranged to correspond to the bottom of the separated rotor 10 inserted into the stirring cup of the stator 21, when the push column 234 moves up, the push column cap 236 is pressed against the bottom of the separated rotor 10 inserted into the stirring cup 1 of the stator 21 to raise the stirring cup 1, thus achieving the effect of easily taking the stirring cup. Through adopting this design, the gravity of the stirring cup 1 and the attraction effect of the separated rotor 10 on the stator 21 are effectively overcome. The device has simple structure, ingenious design, and high practicality.

In practice, under the constraint of the guide structure, the transmission screw rod 232 rotates to propel the push column 234 to move axially, thereby converting the torque of the miniature direct current reduction motor 231 into an axial force enabling the push column 234 to move up and down.

In practice, the base 2 of the blender comprises a base upper cover 20 and a base lower cover 25 that are fixedly connected, and the stator 21 is arranged above the lifting device 23 through a support sleeve 22.

More specifically, the central position of the push column 234 is provided with a threaded hole 2342 which is spirally connected with the transmission screw rod 232. Through adopting this arrangement, the transmission screw rod 232 is coaxially spirally connected with the push column 234, thus enabling the push column 234 to move up and down more stably.

More specifically, the guide structure comprises a guide hole 2352 provided with a guide key 2351 in the support plate 235 and a push column 234 provided with a key groove 2341 on the outer side wall. The push column 234 and the guide hole 2352 are in clearance fit. By means of this design, through the interaction between the guide key 2351 arranged on the inner wall of the guide hole 2352 and the key groove 2341 on the outer side wall of the push column 234, when the transmission screw rod 232 rotates, the push column 234 cannot rotate but move up and down within the guide hole 2352 of the support plate 235.

More specifically, the motor support base 233 is provided with a through hole 2331 for allowing the output shaft of the miniature direct current reduction motor 231 to pass through. Through adopting this arrangement, the number of parts is reduced such that a convenient assembly is achieved.

More specifically, the miniature direct current reduction motor 231 is fixedly connected to the motor support base 233 by screws, the motor support base 233 is fixedly connected to the support plate 235 by screws, and the push column cap 236 is fixed to the top surface of the push column 234 by screws. By means of this structure, the lifting device 23 is assembled and disassembled conveniently.

More specifically, the interior of the base 2 is provided with an electric control assembly 24, and the miniature direct current reduction motor 231 is electrically connected to the electric control assembly 24. Through adopting this structure, the electric control assembly 24 controls the rotating, starting-up, stopping and steering of the miniature direct current reduction motor 231.

The embodiments of the present invention are described above in combination with drawings, but the present invention is not limited to the embodiments above. The detailed description is used for illustrating but not restricting the present invention. It is apparent to those of skill in the art that various forms may be made without departing from the spirit and scope of the present invention, and thus all of which should fall into the scope of the present invention.

What is claimed is:

1. A blender comprising a stirring cup, a stator, a separated rotor, and a lifting device for the stirring cup; the lifting device comprising:
a miniature direct current reduction motor (231), a transmission screw rod (232), a motor support base (233), a push column (234), a support plate (235) and a push column cap (236), wherein the miniature direct current reduction motor (231) is fixedly connected to the motor support base (233), the motor support base (233) is fixedly connected to the support plate (235), and an output shaft of the miniature direct current reduction motor (231) is fixedly connected to the transmission screw rod (232), wherein the transmission screw rod (232) is in threaded connection with the push column (234), wherein when the miniature direct current reduction motor (231) propels the transmission screw rod (232) to rotate, wherein the push column (234) can only move up and down within the support plate (235), wherein the push column cap (236) is fixedly connected to the top of the push column (234), and the push column cap (236) is arranged to correspond to the bottom of the separated rotor (10) inserted into the stirring cup (1), wherein when the push column (234) moves upwards, the push column cap (236) is pressed against the bottom of the separated rotor (10) inserted into the stirring cup (1) of the stator (21) to raise the stirring cup (1), wherein the lifting device (23) is provided below the stator (21) inside a base (2) of the blender, wherein the motor support base (233) is located above the miniature direct current reduction motor (231), wherein the transmission screw rod (232) penetrates a through hole (2331) located on the bottom of the motor support base (233) into a threaded hole (2342) in center of the push column (234), wherein the push column penetrates the support plate (235) through a guide hole (2352) located at the center of the support plate.

2. The blender of claim 1,
wherein the support plate (235) is a circular disc, wherein a protrusion in the guide hole (2352) forms a guide key (2351) and the push column (234) is provided with a key groove (2341) on the outer side wall, wherein the push column (234) fits through the guide hole (2352).

3. The blender of claim 1, wherein the miniature direct current reduction motor (231) is fixedly connected to the motor support base (233) by screws, the motor support base (233) is fixedly connected to the support plate (235) by screws, and the push column cap (236) is fixed to top surface of the push column (234) by screws.

4. The blender of claim 1, wherein interior of the base (2) is provided with an electric control assembly (24), and the miniature direct current reduction motor (231) is electrically connected to the electric control assembly (24).

* * * * *